(12) United States Patent
Li

(10) Patent No.: US 11,745,375 B2
(45) Date of Patent: Sep. 5, 2023

(54) CUTTER ASSEMBLY AND FRUIT AND VEGETABLE CUTTER USING THE CUTTER ASSEMBLY

(71) Applicant: JAZZWAY HOUSEWARES LTD, Shenzhen (CN)

(72) Inventor: Xuewen Li, Shenzhen (CN)

(73) Assignee: JAZZWAY HOUSEWARES LTD, Shenzhen (CN)

( * ) Notice: Subject to any disclaimer, the term of this patent is extended or adjusted under 35 U.S.C. 154(b) by 280 days.

(21) Appl. No.: 17/213,792

(22) Filed: Mar. 26, 2021

(65) Prior Publication Data

US 2022/0250269 A1    Aug. 11, 2022

(30) Foreign Application Priority Data

Feb. 6, 2021  (CN) .......................... 202110176101.4

(51) Int. Cl.
*B26D 1/28* (2006.01)
*B01F 27/172* (2022.01)
(Continued)

(52) U.S. Cl.
CPC .............. *B26D 1/28* (2013.01); *A47J 43/044* (2013.01); *A47J 43/0711* (2013.01); *A47J 43/082* (2013.01); *B01F 27/11251* (2022.01); *B01F 27/172* (2022.01); *B26D 5/10* (2013.01); *B26D 7/2614* (2013.01); *A47J 2043/04409* (2013.01); *B01F 2101/1805* (2022.01); *B26D 2007/0018* (2013.01); *B26D 2210/02* (2013.01)

(58) Field of Classification Search
CPC .......... B26D 1/28; B26D 5/10; B26D 7/2614; B26D 2007/0018; B26D 2210/02; B01F 27/172; B01F 27/11251; B01F 2101/1805; A47J 43/044; A47J 43/0711; A47J 43/082; A47J 2043/04409

See application file for complete search history.

(56) References Cited

U.S. PATENT DOCUMENTS

| 2007/0200018 A1* | 8/2007 | Leung | ................ A47J 43/0711 241/199.12 |
| 2015/0216359 A1* | 8/2015 | Schuette | ............... B01F 35/512 241/282.1 |
| 2017/0112327 A1* | 4/2017 | Harris | .................. A47J 43/044 |

FOREIGN PATENT DOCUMENTS

| CN | 113103327 A | * | 7/2021 | ............... B26D 1/28 |
| CN | 113491459 A | * | 10/2021 | ............ A47J 43/046 |
| WO | WO-2015156551 A1 | * | 10/2015 | .............. A47J 27/14 |

* cited by examiner

*Primary Examiner* — Omar Flores Sanchez
(74) *Attorney, Agent, or Firm* — Li & Cai Intellectual Property (USA) Office

(57) ABSTRACT

Disclosed are a cutter assembly and a fruit and vegetable cutter using the cutter assembly. The cutter assembly includes a rotating shaft assembly, a forward-rotating blade and a counter-rotating blade. The rotating shaft assembly has a first mandrel and a first outer shaft. The end of the first mandrel and the end of the first outer shaft are each provided with a first transmission part coupled to a drive device; the blades are respectively arranged in the shaft assembly and perpendicular to the rotating shaft assembly; one blade is coupled to the first mandrel, and the other is coupled with the first outer shaft, so that the blades can be driven by the rotating shaft assembly to rotate in two opposite directions at the same time. The fruit and vegetable cutter includes a fruit and vegetable cavity, the cutter assembly and a driving device for driving the cutter assembly.

15 Claims, 8 Drawing Sheets

(51) Int. Cl.
*B01F 27/1125* (2022.01)
*A47J 43/044* (2006.01)
*A47J 43/07* (2006.01)
*A47J 43/08* (2006.01)
*B26D 5/10* (2006.01)
*B26D 7/26* (2006.01)
*B01F 101/00* (2022.01)
*B26D 7/00* (2006.01)

CUTTER ASSEMBLY AND FRUIT AND VEGETABLE CUTTER USING THE CUTTER ASSEMBLY

FIELD OF THE DISCLOSURE

The present disclosure relates to kitchen appliances; in particular, to a cutter assembly and a fruit and vegetable cutter using the cutter assembly.

BACKGROUND OF THE DISCLOSURE

The cutter of the existing fruit and vegetable cutter can only rotate in one direction, which has the defect of low vegetable cutting efficiency.

SUMMARY OF THE DISCLOSURE

The purpose of the present disclosure is to provide a cutter assembly and a fruit and vegetable cutter using the cutter assembly, so as to solve the above-mentioned defects in related technologies.

In order to achieve the aforementioned purpose, the technical solution of the present disclosure is as follows.

A cutter assembly is provided, comprising: a rotating shaft assembly having a first mandrel and a first outer shaft, wherein an end of the first mandrel and an end of the first outer shaft are each provided with a first transmission part coupled to a drive device; a forward-rotating blade arranged on the rotating shaft assembly and perpendicular to the rotating shaft assembly; and a counter-rotating blade arranged on the rotating shaft assembly and perpendicular to the rotating shaft assembly; and wherein one of the forward-rotating blade and the counter-rotating blade is coupled to the first mandrel, and the other of the forward-rotating blade and the counter-rotating blade is coupled to the first outer shaft, so that the forward-rotating blade and the counter-rotating blade are driven by the rotating shaft assembly to rotate in two opposite directions at the same time.

In a preferred embodiment, the cutter assembly comprises a plurality of forward-rotating blades and/or a plurality of counter-rotating blades, wherein the forward-rotating blade and the counter-rotating blades are alternately arranged along the axial direction of the rotating shaft assembly.

In a preferred embodiment, the number of shafts of the rotating shaft assembly is equal to the number of the blades, all the shafts of the rotating shaft assembly are sleeved together and the axes thereof coincide, and each of the blades and each of the shafts of the rotating shaft assembly are coupled correspondingly.

In a preferred embodiment, each blade is provided with a coupling hole, and each blade is detachably coupled with the shaft in the rotating shaft assembly through the coupling hole.

In a preferred embodiment, the rotating shaft assembly is provided with a separator for axially positioning the blades between the adjacent blades.

In a preferred embodiment, one end of the first mandrel of the rotating shaft assembly comprises a detachable end cover, and the end cover detachably combines the remaining shafts of the rotating shaft assembly and each blade on the first mandrel.

In a preferred embodiment, the first end of the first mandrel is provided with a shaft seat hole, and the axis of the shaft seat hole coincides with the axis of the first mandrel.

A fruit and vegetable cutter is provided, comprising: a fruit and vegetable cavity having a shaft seat in the center of the bottom; a driving device arranged on the top of the fruit and vegetable cavity and synchronously outputting a clockwise rotation torque and a counterclockwise rotation torque with the same rotation center; and a cutter assembly according to any one of the aforementioned cutter assembly supported on the shaft seat at the bottom of the fruit and vegetable cavity, and each first transmission part at the end correspondingly coupled with each shaft of a power output shaft of the driving device, so that when the driving device is working, the forward-rotating blade and the counter-rotating blade rotate synchronously in two opposite directions.

In a preferred embodiment, the driving device comprises: a power input shaft; a power output shaft having a second mandrel and a second outer shaft; an intermediate gear arranged between the power input shaft and the power output shaft; a reversing gear arranged between the intermediate gear and the power output shaft; and a crank handle coupled with the power input shaft; wherein, the intermediate gear is respectively coupled with the power input shaft and the second mandrel, and the reversing gear is respectively coupled with the intermediate gear and the second outer shaft; alternatively, the intermediate gear is respectively coupled to the power input shaft and the second outer shaft, and the reversing gear is respectively coupled to the intermediate gear and the second mandrel.

In a preferred embodiment, the driving device comprises a plurality of power input shafts, the plurality of power input shafts are respectively coupled with the intermediate gear, a gear ratios of each of the plurality of power input shafts and a gear ratios of the intermediate gear are different from each other, and the crank handle is coupled with different power input shafts.

In a preferred embodiment, the fruit and vegetable cutter further comprises a stirring component and the stirring component comprises: a forward-rotating vane having a shaft; a counter-rotating vane having a shaft, wherein the counter-rotating vane and the counter-rotating vane are superimposed, and the shaft of the counter-rotating vane and the shaft of the forward rotation vane are sleeved and the axes thereof coincide; and the shaft of the counter-rotating vane and the shaft of the forward-rotating vane are each provided with a second transmission portion for coupling with the driving device at the ends.

Compared with the prior art, the present disclosure has at least the following beneficial effects.

The present disclosure is provided with a forward-rotating blade and a counter-rotating blade, which can rotate and cut vegetables in a clockwise direction and a counterclockwise direction at the same time, so it has the characteristics of high efficiency.

The present disclosure adopts the same driving device to drive the blades in two rotation directions to work synchronously, so it has the characteristics of low cost.

In a preferred embodiment, the shafts and blades of the cutter assembly are detachably combined with the first mandrel through the end cap at the end of the first mandrel, so that the blades can be replaced individually, and the blades are independent of each other, and any one of the blades can be replaced separately, so it has the characteristics of low cost.

Figure 1:
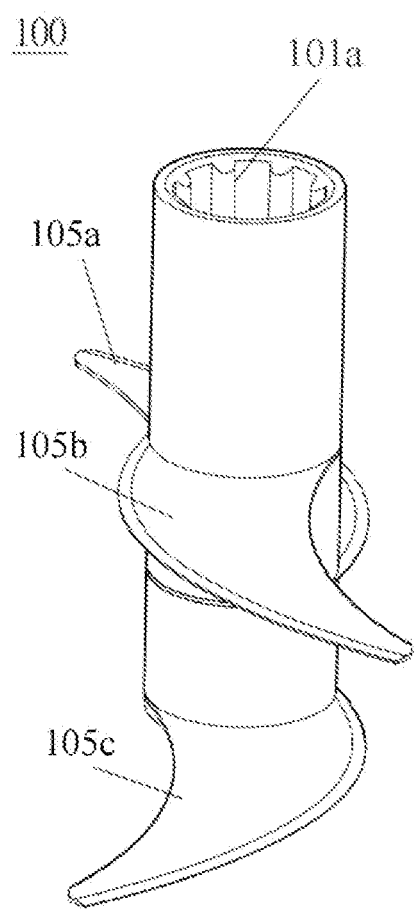
FIG. 1 is a perspective view of the cutter assembly of a preferred embodiment.

Reference numeral: 100. cutter assembly; 200. driving device; 300. handle; 400. fruit and vegetable cavity; 500. stirring assembly; 101. first transmission part; 102. first mandrel; 103. first outer shaft; 104. separator; 105. blade; 106. end cover; 107. shaft seat hole; 1051. coupling hole; 1061. Screw; 210. power output shaft; 211. second mandrel; 212. second outer shaft; 220. intermediate gear; 230. power input shaft; 240. reversing gear; 250. crank handle; 410. shaft seat; 501. vane; 502. shaft; 503. second transmission part.

DETAILED DESCRIPTION OF THE EXEMPLARY EMBODIMENTS

The present disclosure will be further described below in conjunction with the drawings and embodiments.

In this application, the first, second, and other similar terms are used to distinguish different components with the same name, and do not have the meaning of order, importance, or other meanings. The terms forward and reverse in the present application are used to indicate two opposite directions, and do not refer to specific directions. There are many terms in the present application, including two or more cases.

Figure 2:
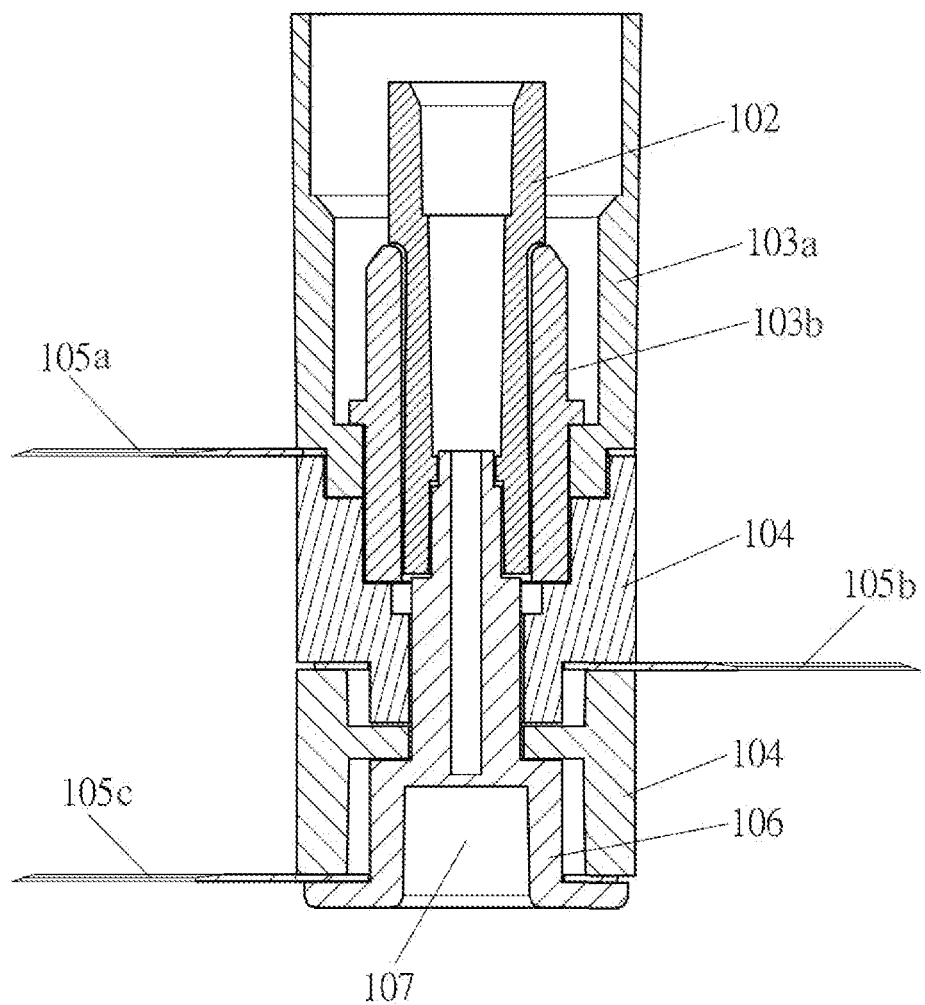
FIG. 2 is a sectional view according to FIG. 1.
Figure 3:
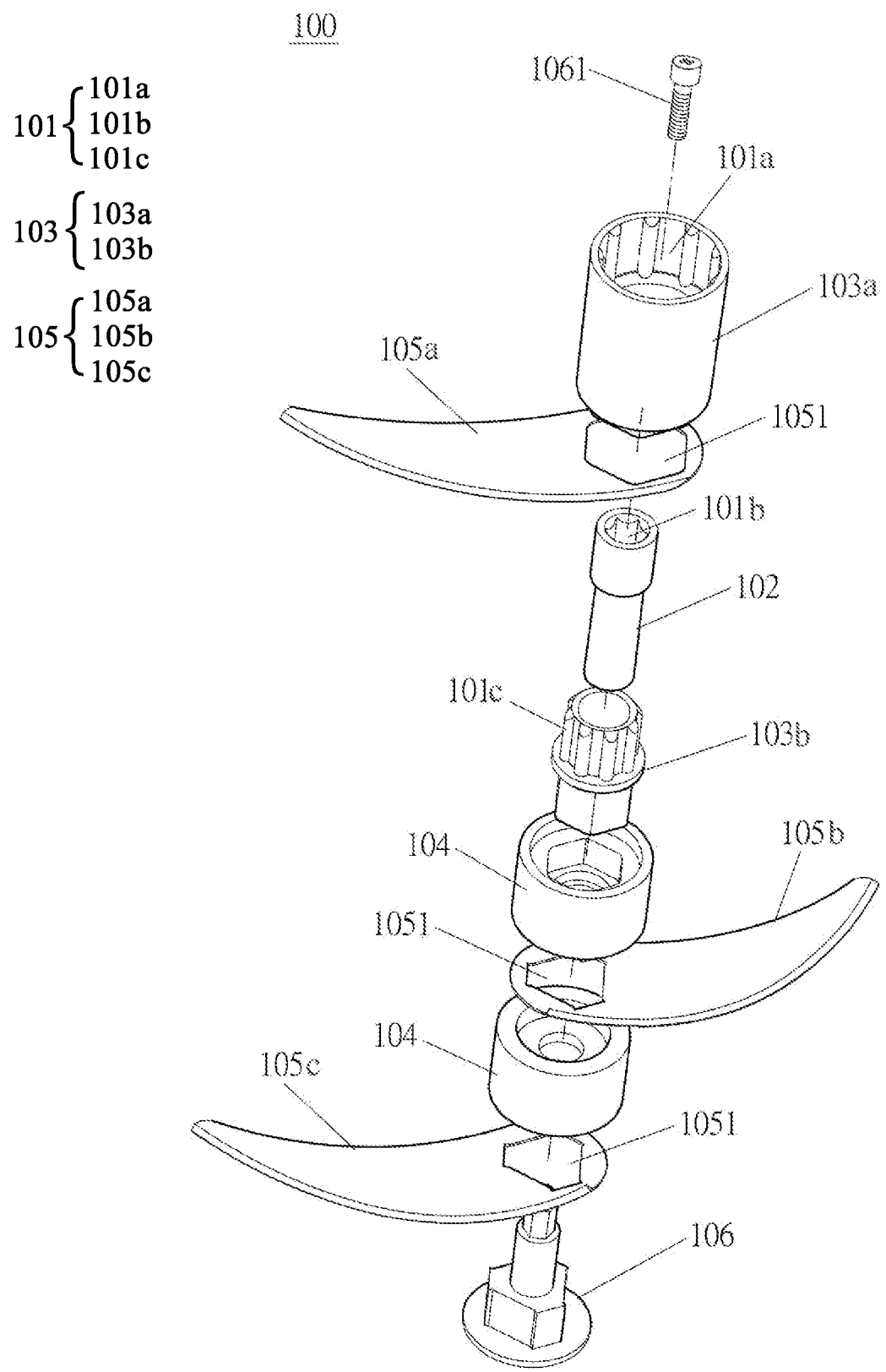
FIG. 3 is an exploded view according to FIG. 1.

FIGS. 1 to 3 respectively show the exterior, cross-sectional view and disassembled structure of the cutter assembly 100 of a preferred embodiment. The cutter assembly 100 includes a rotating shaft assembly, three blades 105 are arranged on the rotating shaft assembly, and the three blades 105 are perpendicular to the rotating shaft assembly.

The rotating shaft assembly has three shafts. The three shafts are sleeved with each other and the axes thereof coincide. For ease of description, the present application refers to the most central shaft as the first mandrel 102, and the remaining shafts as the first outer shaft 103. Therefore, specifically, in the present embodiment, there are two first outer shafts 103, of which one of the first outer shafts 103 is sleeved on the outside of the first mandrel 102 and is hereinafter referred to as the inner first outer shaft 103b, and the other outer shaft is sleeved on the outside of the inner first outer shaft 103b and is hereinafter referred to as the outer first outer shaft 103a.

As shown in FIG. 3, the end of the first mandrel 102 (upper end in the figure) is provided with a polygonal inner hole, which serves as the first transmission part 101 for coupling the driving device 200 (see FIG. 5) to the polygonal inner hole to drive the first mandrel 102 to rotate. The top end of the first mandrel 102 (the lower end in the figure) has a shaft seat hole 107. The axis of the shaft seat hole 107 coincides with the axis of the first mandrel 102. The shaft seat hole 107 is used to cooperate with the shaft seat 410 (see FIG. 5) at the bottom of the fruit and vegetable cavity 400 of the fruit and vegetable cutter, so that the rotating shaft assembly is vertically supported in the fruit and vegetable cavity 400. In addition, the top end of the first mandrel 102 (the lower end in the figure) is connected to one end cover 106 by a screw 1061, and the shaft seat hole 107 is arranged in the end cover 106. By means of the end cover 106, the two first outer shafts 103 and three blades 105 are combined on the first mandrel 102. After removing the end cap 106 from the first mandrel 102, any blade 105 can be easily removed.

As shown in FIG. 3, the end (upper end in the figure) of the outer first outer shaft 103a is provided with a plurality of vertical protrusions on the inner peripheral wall, constituting the first transmission part 101a of the outer first outer shaft 103a for driving the driving device 200 (see FIG. 5) to couple to the first transmission part 101a of the outer first outer shaft 103a to drive the outer first outer shaft 103a to rotate.

As shown in FIG. 3, the end (upper end in the figure) of the inner first outer shaft 103b is provided with a plurality of vertical protrusions on the outer peripheral wall, constituting the first transmission part 101c of the inner first outer shaft 103b for driving the driving device 200 (see FIG. 5) to couple to the first transmission part 101c of the inner first outer shaft 103b to drive the inner first outer shaft 103b to rotate.

As shown in FIG. 3, the three blades 105 are each provided with a polygonal coupling hole 1051, through which the blade 105 is correspondingly assembled on the first mandrel 102 or the first outer shaft 103, so that when the first mandrel 102 or the first outer shaft 103 rotates, the corresponding blade 105 is driven to rotate. On the other hand, the blade 105 can be easily removed from the first mandrel 102 or the first outer shaft 103. It should be understood that, in addition to polygonal holes, special-shaped holes, elliptical holes or semi-circular holes can also be used to achieve the above-mentioned purpose.

As shown in FIG. 2, in the present embodiment, from bottom to top, three blades 105 are correspondingly coupled to the first mandrel 102, the inner first outer shaft 103b and the outer first outer shaft 103a. When the first mandrel 102 and the outer first outer shaft 103a are driven to rotate clockwise and the inner first outer shaft 103b is driven to rotate counterclockwise, the upper blade 105a (of the three blades 105) and the lower blade 105c (of the three blades 105) will be driven clockwise and the middle blade 105b (of the three blades 105) will be driven to rotate counterclockwise; otherwise, the upper blade 105a (of the three blades 105) and the lower blade 105c (of the three blades 105) will be driven to rotate counterclockwise, and the middle blade 105b (of the three blades 105) will be driven to rotate clockwise. That is, the structure of the cutter assembly 100 described above enables the three blades 105 to be driven by the rotating shaft assembly to rotate in two opposite directions at the same time. Compared with a cutter that rotates in a single direction, the cutter assembly 100 of the present embodiment has a higher efficiency.

If clockwise rotation is called forward rotation, two of the above three blades 105 are forward-rotating blades 105 and the other one is counter-rotating blade 105, or one is the present blade 105, and the remaining two are counter-rotating blades 105. In addition, in the present embodiment, the forward-rotating blade 105 and the counter-rotating blade 105 are alternately arranged along the axial direction of the rotating shaft assembly.

Reference is made to FIGS. 2 and 3. The rotating shaft assembly is further provided with a separator 104 for axially positioning the blades 105 between the adjacent blades 105, so that the blades 105 will not move in the axial direction.

Based on the above enlightenment, those skilled in the art should understand that it is also possible to configure only two blades 105, of which one for forward-rotating and the other for counter-rotating; or four blades 105, of which two for forward-rotating and the other two for counter-rotating, and so on.

In addition, as a sub-optimal implementation, the blade 105 can also be connected to the shaft in the rotating shaft assembly in a fixed connection manner. The fixed connection methods that can be used include but are not limited to welding, riveting, or integral molding processes. In the sub-optimal embodiment, when the blade 105 is worn out, the cutter assembly 100 needs to be replaced as a whole, and the use cost is relatively high.

Figure 4:
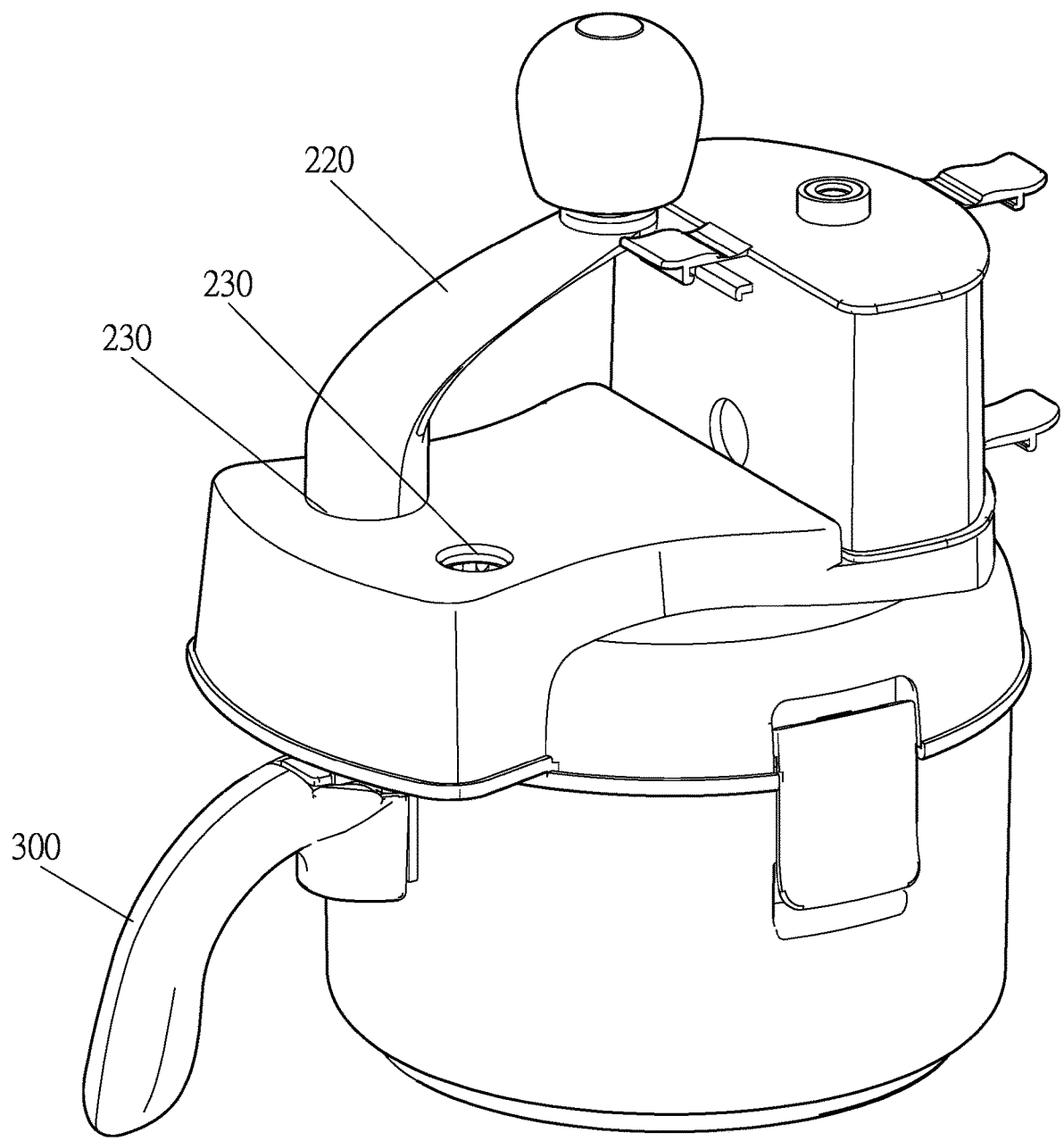
FIG. 4 is a perspective view of the fruit and vegetable cutter of a preferred embodiment.
Figure 5:
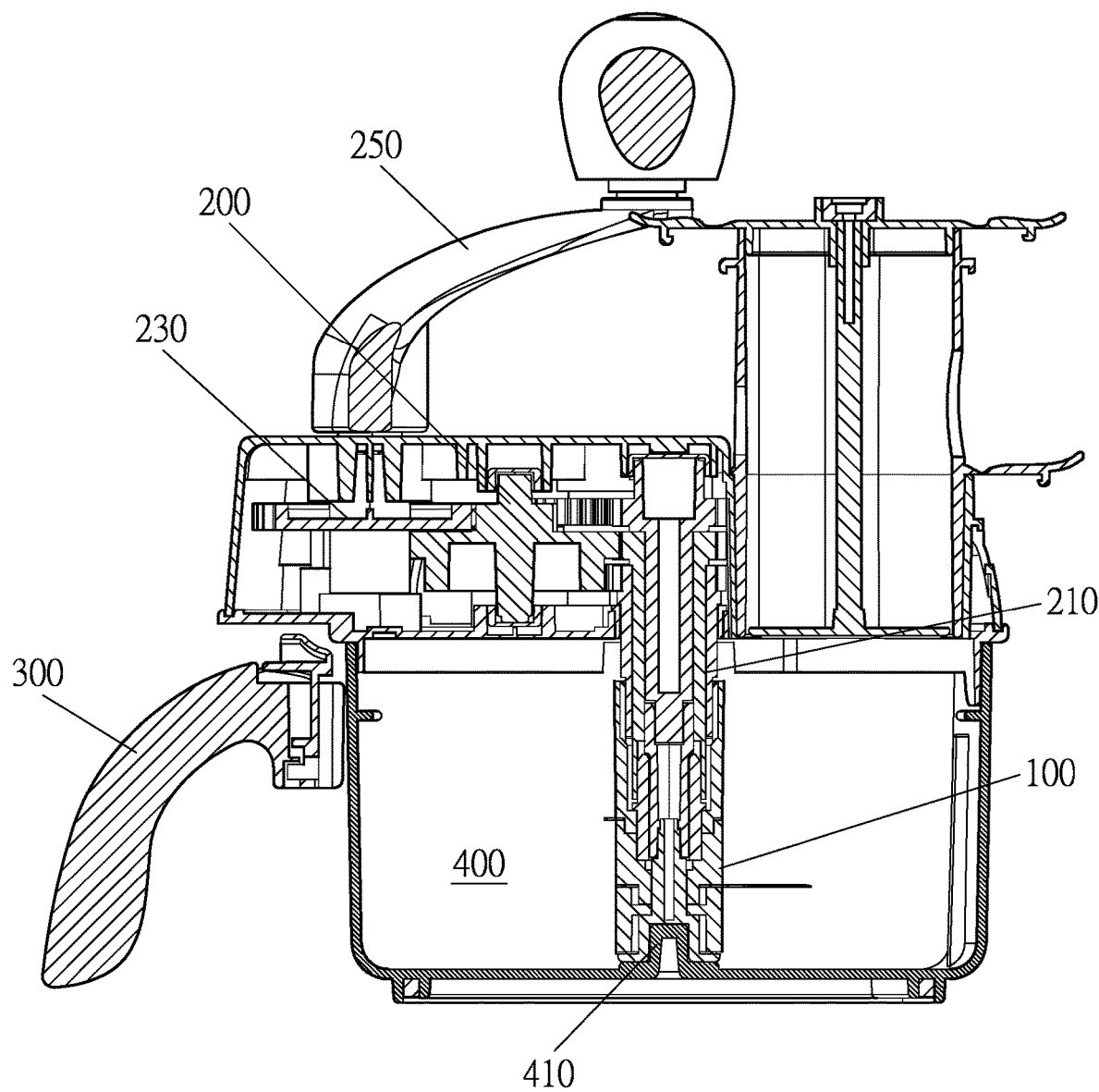
FIG. 5 is a sectional view according to FIG. 4.
Figure 6:
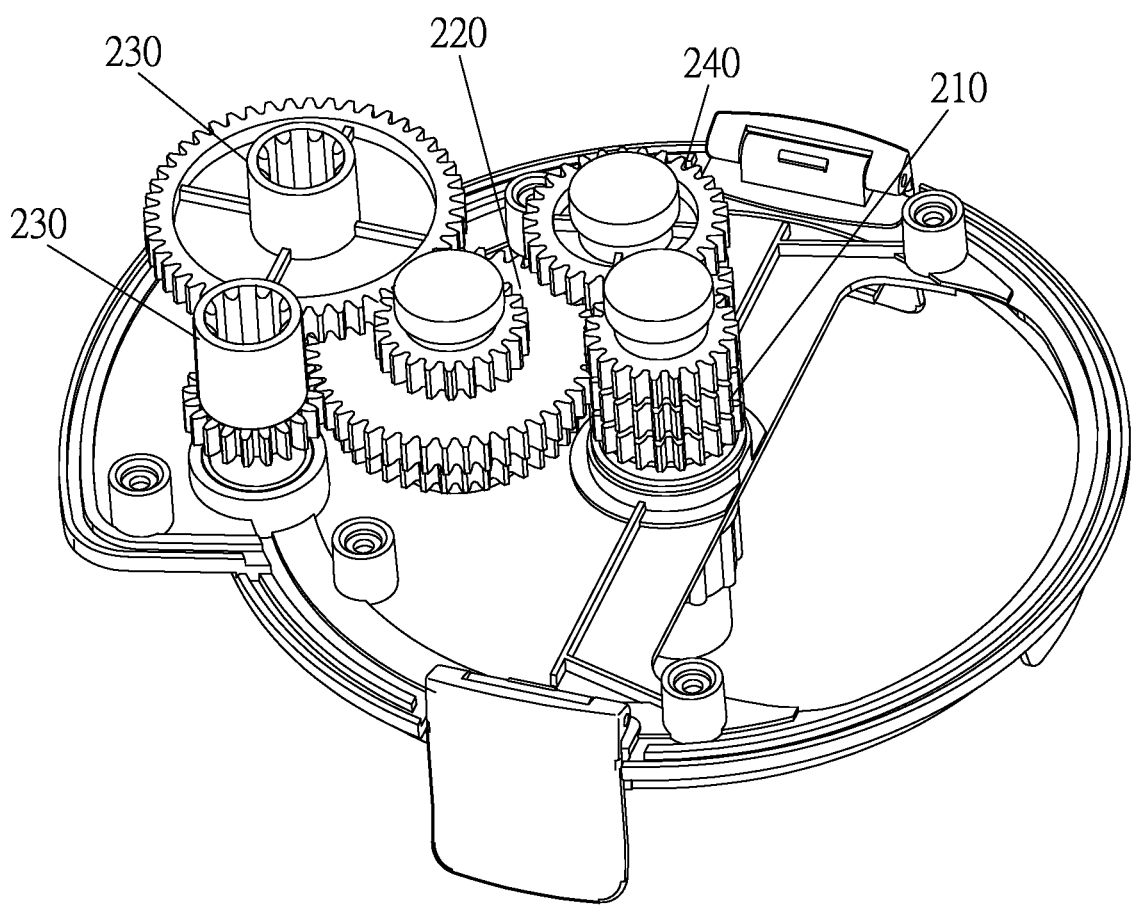
FIG. 6 is a schematic diagram of the structure of the driving device according to FIG. 4.
Figure 7:
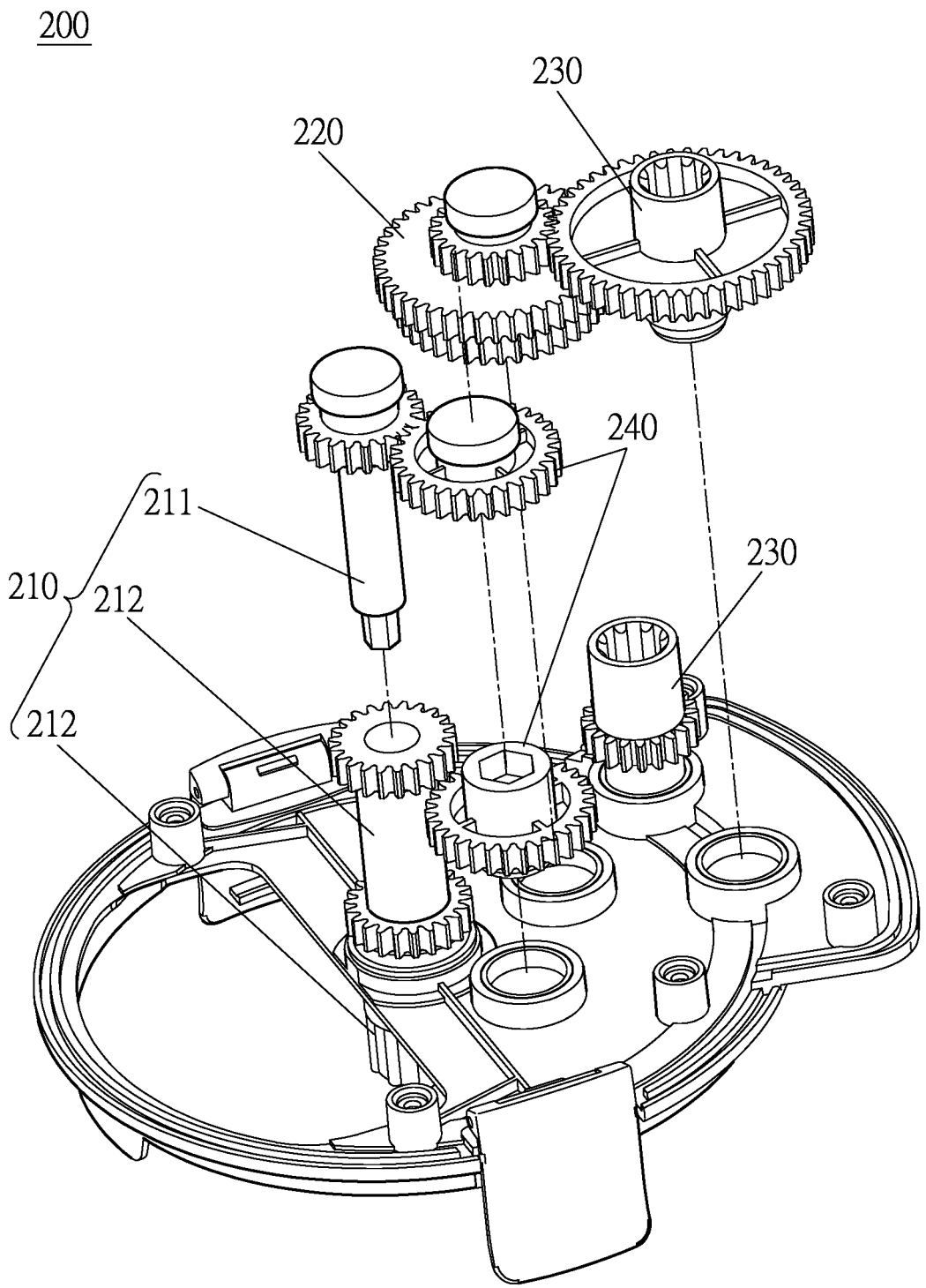
FIG. 7 is an exploded view of the driving device according to FIG. 4.

FIGS. 4 to 5 show the structure of a preferred embodiment of the fruit and vegetable cutter. FIGS. 6 to 7 show the structure of the driving device 200 thereof. As shown in FIGS. 4 to 5, the fruit and vegetable cutter includes a fruit and vegetable cavity 400, a driving device 200 and a cutter assembly 100. There is a shaft seat 410 at the center of the bottom of the fruit and vegetable cavity 400. The driving device 200 is disposed on the top of the fruit and vegetable cavity 400, and can synchronously output a clockwise rotation torque and a counterclockwise rotation torque with the same rotation center. In addition, a handle 300 is also arranged on one side of the fruit and vegetable cavity 400.

Reference is made to FIGS. 4-7. The structure of the driving device 200 specifically includes: two power input shafts 230, a power output shaft 210, an intermediate gear 220, a reversing gear 240, and a crank handle 250. The power input shafts 230, the power output shaft 210, the intermediate gear 220 and the reversing gear 240 are each supported on the top of the fruit and vegetable cavity 400 through a shaft.

As shown in FIG. 7, the power output shaft 210 has a second mandrel 211 and two second outer shafts 212, and one of the second outer shafts 212 is sleeved outside the second mandrel 211. For the convenience of description, it is called the inner second outer shaft 212, and the other second outer shaft 212 is sleeved on the outside of the second outer shaft 212. For the convenience of description, it is called the outer second outer shaft 212.

As shown in FIGS. 6 and 7, the intermediate gear 220 is arranged between the power input shaft 230 and the power output shaft 210, and is coupled with the gear on the inner second outer shaft 212. The gears on the two power input shafts 230 are respectively coupled to the intermediate gear 220, and the gear ratios of the two power input shafts 230 and the gear ratio of the intermediate gear 220 are different. For ease of description, a power input shaft 230 is called a normal shaft, and the other power input shaft 230 is called a labor-saving shaft.

As shown in FIGS. 6 and 7, the reversing gear 240 is arranged between the intermediate gear 220 and the power output shaft 210. On the one hand, the reversing gear 240 is coupled with the intermediate gear 220, and on the other hand, the main gear and the secondary gear of the reversing gear 240 are correspondingly coupled with the gear on the second core shaft 211 and the gear on the outer second outer shaft 212.

The crank handle 250 can be inserted into the corresponding power input hole on the top cover of the fruit and vegetable cutter, and is coupled with the gear on the corresponding power input shaft 230 (normal shaft or labor-saving shaft).

The cutter assembly 100 is the cutter assembly of the aforementioned preferred embodiment. Referring to FIGS. 5, 7, and 2, the shaft seat hole 107 on the cutter assembly 100 is matched with the shaft seat 410 at the bottom of the fruit and vegetable cavity 400, and the cutter assembly 100 is supported in the fruit and vegetable cavity 400. The second mandrel 211 of the power output shaft 210 of the drive device 200, the inner second shaft 212, the outer second outer shaft 212 are correspondingly coupled to the first mandrel 102 of the cutter assembly 100, the outer first outer shaft 103a, and the first transmission part 101a at the end of the outer first outer shaft 103a (upper end in the figure).

When the crank handle 250 is rotated, the power input shaft 230 drives the inner second outer shaft 212 to rotate through the intermediate gear 220, and then drives the inner first outer shaft 103b to rotate clockwise. At the same time, the intermediate gear 220 drives the reversing gear 240 to rotate. The reversing gear 240 drives the second mandrel 211 and the inner second outer shaft 212 to rotate synchronously, and then drives the first mandrel 102 and the outer first outer shaft 103a to rotate counterclockwise synchronously, so as to reach that the upper blade 105a (of the three blades 105) and the lower blade 105c (of the three blades 105) synchronously rotate counterclockwise, and the middle blade 105b (of the three blades 105) synchronously rotates clockwise. That is, when the handle 300 is shaken, the three blades 105 rotate synchronously in two opposite directions.

The fruit and vegetable cutter of the present preferred embodiment can be used by different people. When used by an adult, the crank handle 250 is coupled with a normal shaft. When used by children or the elderly, the crank handle 250 is coupled with the labor-saving shaft.

Based on the above enlightenment, it can be understood that coupling the intermediate gear 220 with the second mandrel 211 and the outer second outer shaft 212 and coupling the reversing gear 240 with the inner second outer shaft 212 can also achieve that when the handle 300 is shaken, the three blades 105 rotate synchronously in two opposite directions.

Figure 8:
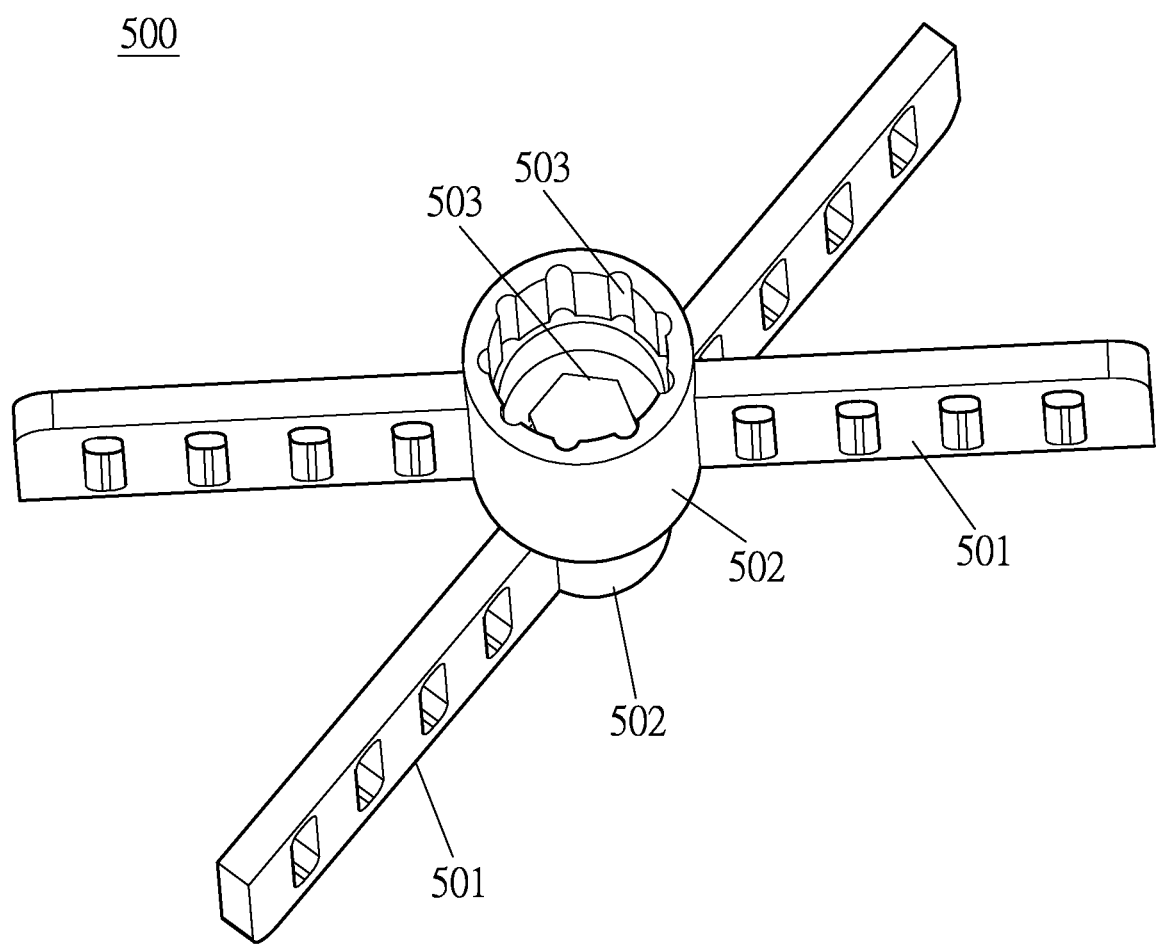
FIG. 8 is a schematic diagram of the structure of the stirring assembly.

The fruit and vegetable cutter of the present disclosure further includes a stirring assembly. FIG. 8 shows a structure of a stirring assembly 500. As shown in FIG. 8, the stirring assembly 500 includes two vanes 501, one is a forward-rotating vane and the other is a counter-rotating vane, each of the two vanes 501 has a shaft 502, and the end of the shaft 502 is each provided with a second transmission part 503 for coupling to the driving device 200. The two vanes 501 are superimposed, and the shafts 502 of the two vanes 501 are sleeved and the axes thereof coincide.

When in use, the cutter assembly 100 is removed, and the two second transmission parts 503 of the stirring assembly 500 are correspondingly coupled to the second mandrel 211 and the second outer shaft 212 of the power output shaft 210 of the driving device 200, as described above. When the crank handle 250 is rotated, the second mandrel 211 and the second outer shaft 212 rotate synchronously in two opposite directions. Therefore, the two vanes 501 of the stirring assembly 500 are driven to rotate synchronously in two opposite directions. It can be used to stir liquids such as egg liquid.

According to different applications, the user can choose to use different power output shafts. For example, when beating eggs, because the resistance is small, the user can choose the crank handle 250 to couple with the normal shaft, and when cutting vegetables or when used for hard fruits and vegetables, since the resistance is relatively large, the crank handle 250 is preferably coupled to the labor-saving shaft.

The cutter assembly 100 of the present disclosure can also be applied to juicers, meat grinders and the like.

The present disclosure has been described in detail through specific embodiments described above. These detailed descriptions are only limited to helping those skilled in the art understand the content of the present disclosure, and should not be construed as limiting the protection scope of the present disclosure. Various modifications, equivalent transformations, etc., performed by those skilled in the art on the above solutions under the concept of the present disclosure should be included in the protection scope of the present disclosure.

What is claimed is:

1. A cutter assembly, comprising:
   a rotating shaft assembly having a first mandrel and a first outer shaft, wherein an end of the first mandrel and an end of the first outer shaft are each provided with a first transmission part coupled to a drive device;
   a forward-rotating blade arranged on the rotating shaft assembly and perpendicular to the rotating shaft assembly; and
   a counter-rotating blade arranged on the rotating shaft assembly and perpendicular to the rotating shaft assembly; and
   wherein one of the forward-rotating blade and the counter-rotating blade is coupled to the first mandrel, and the other of the forward-rotating blade and the counter-rotating blade is coupled to the first outer shaft, so that the forward-rotating blade and the counter-rotating blade are driven by the rotating shaft assembly to rotate in two opposite directions at the same time,
   wherein the rotating shaft assembly is provided with a separator for axially positioning the blades between the adjacent blades.

2. The cutter assembly according to claim 1, comprising a plurality of forward-rotating blades and/or a plurality of counter-rotating blades, wherein the forward-rotating blade and the counter-rotating blades are alternately arranged along the axial direction of the rotating shaft assembly.

3. The cutter assembly according to claim 2, wherein a number of shafts of the rotating shaft assembly is equal to a number of the blades, all the shafts of the rotating shaft assembly are sleeved together and the axes thereof coincide, and each of the blades and each of the shafts of the rotating shaft assembly are coupled correspondingly.

4. The cutter assembly according to claim 1, wherein each blade is provided with a coupling hole, and is detachably coupled with the shaft in the rotating shaft assembly through the coupling hole.

5. The cutter assembly according to claim 1, wherein one end of the first mandrel of the rotating shaft assembly comprises a detachable end cover, and the end cover detachably combines the remaining shafts of the rotating shaft assembly and each blade on the first mandrel.

6. The cutter assembly according to claim 5, wherein a first end of the first mandrel is provided with a shaft seat hole, and the axis of the shaft seat hole coincides with the axis of the first mandrel.

7. A fruit and vegetable cutter, comprising:
   a fruit and vegetable cavity having a shaft seat in the center of the bottom;
   a driving device arranged on the top of the fruit and vegetable cavity and synchronously outputting a clockwise rotation torque and a counterclockwise rotation torque with the same rotation center; and
   a cutter assembly according to claim 1 supported on the shaft seat at the bottom of the fruit and vegetable cavity, and each first transmission part at the end correspondingly coupled with each shaft of a power output shaft of the driving device, so that when the driving device is working, the forward-rotating blade and the counter-rotating blade rotate synchronously in two opposite directions.

8. The fruit and vegetable cutter according to claim 7, wherein the driving device comprises:
   a power input shaft;
   a power output shaft having a second mandrel and a second outer shaft;
   an intermediate gear arranged between the power input shaft and the power output shaft;
   a reversing gear arranged between the intermediate gear and the power output shaft; and
   a crank handle coupled with the power input shaft;
   wherein, the intermediate gear is respectively coupled with the power input shaft and the second mandrel, and the reversing gear is respectively coupled with the intermediate gear and the second outer shaft; alternatively, the intermediate gear is respectively coupled to the power input shaft and the second outer shaft, and the reversing gear is respectively coupled to the intermediate gear and the second mandrel.

9. The fruit and vegetable cutter according to claim 8, wherein the driving device comprises a plurality of power input shafts, the plurality of power input shafts are respectively coupled with the intermediate gear, a gear ratios of each of the plurality of power input shafts and a gear ratios of the intermediate gear are different from each other, and the crank handle is coupled with different power input shafts.

10. The fruit and vegetable cutter according to claim 7, the cutter assembly comprises a plurality of forward-rotating blades and/or a plurality of counter-rotating blades, wherein the forward-rotating blade and the counter-rotating blades are alternately arranged along the axial direction of the rotating shaft assembly.

11. The fruit and vegetable cutter according to claim 10, wherein the number of shafts of the rotating shaft assembly is equal to the number of the blades, all the shafts of the rotating shaft assembly are sleeved together and the axes thereof coincide, and each of the blades and each of the shafts of the rotating shaft assembly are coupled correspondingly.

12. The fruit and vegetable cutter according to claim 7, wherein each blade is provided with a coupling hole, and is detachably coupled with the shaft in the rotating shaft assembly through the coupling hole.

13. The fruit and vegetable cutter according to claim 7, wherein one end of the first mandrel of the rotating shaft assembly comprises a detachable end cover, and the end cover detachably combines the remaining shafts of the rotating shaft assembly and each blade on the first mandrel.

14. The fruit and vegetable cutter according to claim 7, wherein the first end of the first mandrel is provided with a shaft seat hole, and the axis of the shaft seat hole coincides with the axis of the first mandrel.

15. The fruit and vegetable cutter according to claim 7, wherein the fruit and vegetable cutter further comprises a stirring component and the stirring component comprises:
   a forward-rotating vane having a shaft;
   a counter-rotating vane having a shaft, wherein the counter-rotating vane and the counter-rotating vane are superimposed, and the shaft of the counter-rotating vane and the shaft of the forward rotation vane are sleeved and the axes thereof coincide; and the shaft of the counter-rotating blade and the shaft of the forward-rotating blade are each provided with a second transmission portion for coupling with the driving device at the ends.

* * * * *